United States Patent
Byun et al.

(10) Patent No.: US 8,673,479 B2
(45) Date of Patent: Mar. 18, 2014

(54) SECONDARY BATTERY AND A SECONDARY BATTERY MODULE

(75) Inventors: Sang-Won Byun, Yongin-si (KR); Yong-Sam Kim, Yongin-si (KR); Sung-Bae Kim, Yongin-si (KR); Soo-Soek Choi, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 452 days.

(21) Appl. No.: 12/926,702

(22) Filed: Dec. 6, 2010

(65) Prior Publication Data

US 2011/0244308 A1    Oct. 6, 2011

Related U.S. Application Data

(60) Provisional application No. 61/282,772, filed on Mar. 30, 2010.

(51) Int. Cl.
    *H01M 2/20* (2006.01)
    *H01M 2/30* (2006.01)

(52) U.S. Cl.
    USPC .......................................... 429/158; 429/178

(58) Field of Classification Search
    USPC .................................................. 429/158, 178
    See application file for complete search history.

(56) References Cited

U.S. PATENT DOCUMENTS

| | | | |
|---|---|---|---|
| 7,501,202 B2 * | 3/2009 | Enomoto et al. | 429/170 |
| 2004/0023107 A1 * | 2/2004 | Nakanishi et al. | 429/161 |
| 2005/0100785 A1 | 5/2005 | Enomoto et al. | |
| 2006/0051664 A1 | 3/2006 | Tasai et al. | |
| 2009/0104510 A1 | 4/2009 | Fulop et al. | |
| 2009/0136843 A1 * | 5/2009 | Yamamoto et al. | 429/179 |
| 2010/0233526 A1 * | 9/2010 | Tasai et al. | 429/164 |
| 2011/0081572 A1 | 4/2011 | Byun et al. | |
| 2011/0244309 A1 | 10/2011 | Byun et al. | |
| 2012/0263986 A1 | 10/2012 | Fulop et al. | |

FOREIGN PATENT DOCUMENTS

| | | |
|---|---|---|
| GB | 1 367 167 | 10/1971 |
| JP | 2002-216716 A | 8/2002 |
| JP | 2002-324541 A | 11/2002 |
| JP | 2006-289400 A | 10/2006 |

(Continued)

OTHER PUBLICATIONS

Korean Notice of Allowance in KR 10-2010-0091089, dated Oct. 31, 2012 (Byun, et al.).

(Continued)

*Primary Examiner* — Karie O'Neill Apicella
(74) *Attorney, Agent, or Firm* — Lee & Morse, P.C.

(57) ABSTRACT

A secondary battery and a secondary battery module, the secondary battery including an electrode assembly, the electrode assembly including a positive electrode, a negative electrode, and a separator therebetween; a case for accommodating the electrode assembly; a cap plate for sealing the case; and at least one terminal unit, the at least one terminal unit including a multi-metal electrode rivet electrically connected to one of the electrodes of the electrode assembly, the multi-metal electrode rivet including a first part and a second part, and, a rivet terminal, the rivet terminal being electrically connected to the multi-metal electrode rivet; wherein the rivet terminal and the second part are each formed of a second metallic material, the first part is formed of a first metallic material, and the first metallic material is different from the second metallic material.

14 Claims, 7 Drawing Sheets

(56) References Cited

FOREIGN PATENT DOCUMENTS

| JP | 2011-077039 A | 4/2011 |
|---|---|---|
| JP | 2011-210725 A | 10/2011 |
| KR | 10 2001-0017098 A | 3/2001 |
| WO | WO 2009/036444 A2 | 3/2009 |

OTHER PUBLICATIONS

Japanese Office Action in JP 2011-060883, dated Mar. 19, 2013 (Byun, et al.).
European Search Report in EP 11158652.5-1359, dated Jul. 4, 2013 (Byun, et al.).

\* cited by examiner

SECONDARY BATTERY AND A SECONDARY BATTERY MODULE

CROSS-REFERENCE TO RELATED APPLICATION

The present application claims priority under 35 U.S.C. §119(e) to U.S. Provisional Application No. 61/282,772, filed on Mar. 30, 2010, and entitled: "Terminal Unit for Secondary Battery," which is incorporated herein by reference in its entirety.

BACKGROUND

1. Field

Embodiments relate to a secondary battery and a secondary battery module.

2. Description of the Related Art

Secondary batteries are rechargeable batteries, and may be broadly used in portable electronic devices, e.g., cellular phones, notebook computers, and camcorders.

A secondary battery is formed by inserting an electrode assembly, in which a positive electrode, a negative electrode, and a separator are wound in the form of a jelly roll, into a case through an opening of the case, and covering the opening by using a cap assembly. Current collecting plates are formed at two ends of the electrode assembly and are electrically connected to a terminal unit of the cap assembly. Accordingly, if an external terminal is connected to the terminal unit, current generated in the electrode assembly may be provided to the external terminal via the current collecting plates and the terminal unit.

The terminal unit may include a positive electrode rivet and a negative electrode rivet connected to the current collecting plates, and rivet terminals bonded to the positive and negative electrode rivets in order to be connected to bus bars. Bonding between the positive electrode rivet or the negative electrode rivet and a rivet terminal, and between a rivet terminal and a bus bar may be performed by using a laser welding method. However, since the positive and negative electrode rivets are generally formed of dissimilar metals, if the rivet terminals are formed by using one metal, dissimilar metal welding may be performed between the positive electrode rivet or the negative electrode rivet and a rivet terminal.

SUMMARY

Embodiments are directed to a secondary battery and a secondary battery module, which represents advances over the related art.

It is a feature of an embodiment to provide a secondary battery including a terminal capable of preventing a reduction in weldability caused when dissimilar metal welding is performed.

At least one of the above and other features and advantages may be realized by providing a secondary battery including an electrode assembly, the electrode assembly including a positive electrode, a negative electrode, and a separator therebetween; a case for accommodating the electrode assembly; a cap plate for sealing the case; and at least one terminal unit, the at least one terminal unit including a multi-metal electrode rivet electrically connected to one of the electrodes of the electrode assembly, the multi-metal electrode rivet including a first part and a second part, and, a rivet terminal, the rivet terminal being electrically connected to the multi-metal electrode rivet; wherein the rivet terminal and the second part are each formed of a second metallic material, the first part is formed of a first metallic material, and the first metallic material is different from the second metallic material.

The first metallic material may be copper and the second metallic material may be aluminum.

The first part and the second part may be friction stir welded to each other.

The second part of the multi-metal electrode rivet may be laser welded to the rivet terminal.

The secondary battery may further include a clad unit between the first part and the second part.

The clad unit may include a first metal layer and a second metal layer between the first part and the second part, the first metal layer being coupled to the first part and the second metal layer being coupled to the second part, the first metal layer being formed of the first metallic material, and the second metal layer being formed of the second metallic material.

The second part may be riveted to the rivet terminal.

The first part may be a head part and the second part may be a tail part.

The secondary battery may further include another terminal unit, the other terminal unit including another rivet terminal and another electrode rivet, wherein the other rivet terminal and the other electrode rivet are formed of a same metallic material.

The terminal unit including the multi-metal electrode rivet may have a polarity opposite to a polarity of the other terminal unit including the other electrode rivet.

Another electrode of the electrode assembly may be electrically connected to at least one of the cap plate and the case.

At least one of the above and other features and advantages may also be realized by providing a secondary battery module including a plurality of secondary batteries, at least one of the secondary batteries including an electrode assembly, the electrode assembly including a positive electrode, a negative electrode, and a separator therebetween; a case for accommodating the electrode assembly; a cap plate for sealing the case; and at least one terminal unit, the at least one terminal unit including a multi-metal electrode rivet electrically connected to one of the electrodes of the electrode assembly, the multi-metal electrode rivet including a first part and a second part, and a rivet terminal, the rivet terminal being electrically connected to the multi-metal electrode rivet; wherein the rivet terminal and the second part are each formed of a second metallic material, the first part is formed of a first metallic material, and the first metallic material is different from the second metallic material.

The secondary battery module may further include a bus bar coupled to the terminal unit of at least one of the secondary batteries and to an adjacent secondary battery.

The bus bar may be formed of the second metallic material.

The bus bar may be coupled to a terminal of the adjacent secondary battery.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 1:
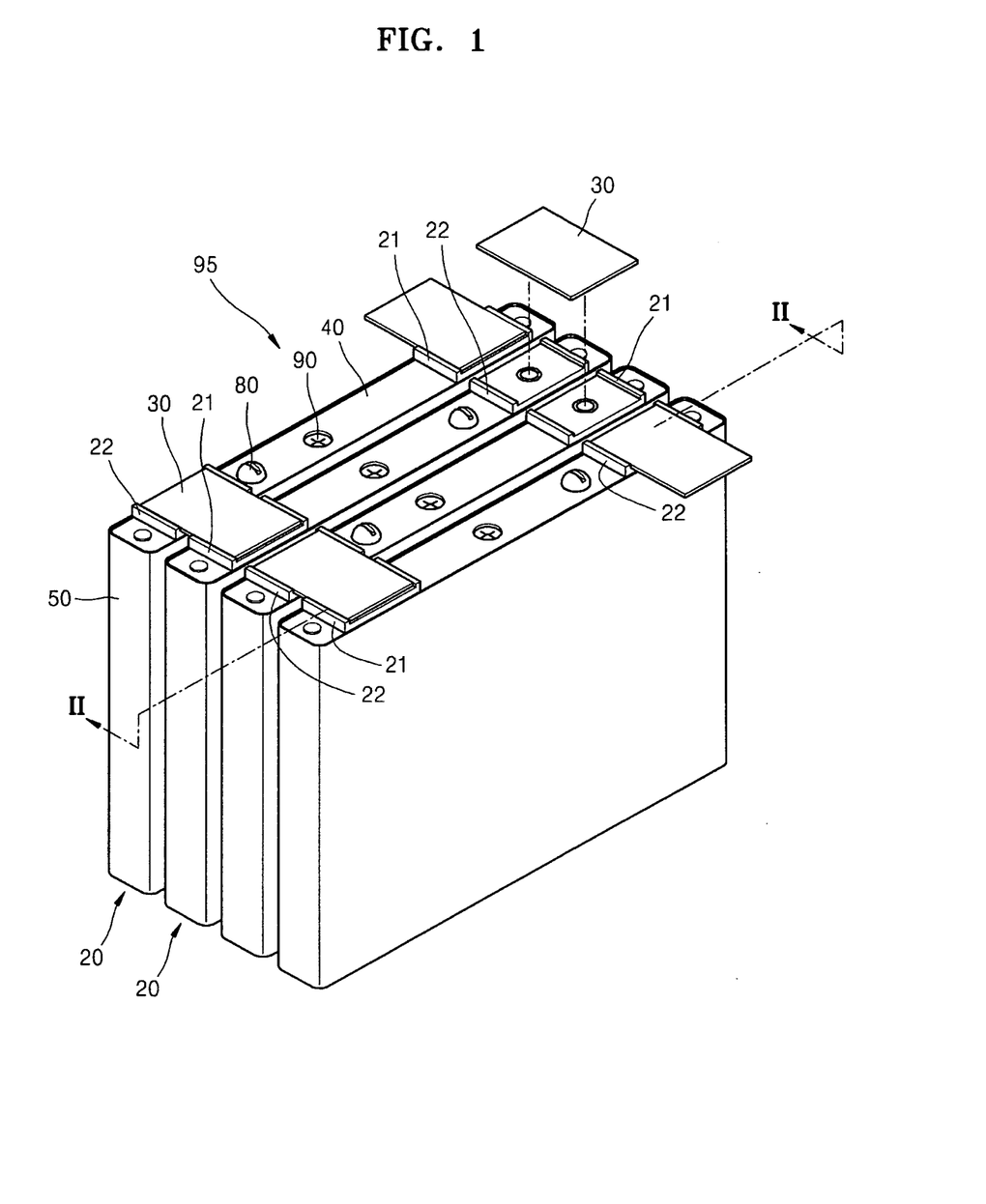
FIG. 1 illustrates a perspective view of a secondary battery module according to an embodiment.
Figure 2:
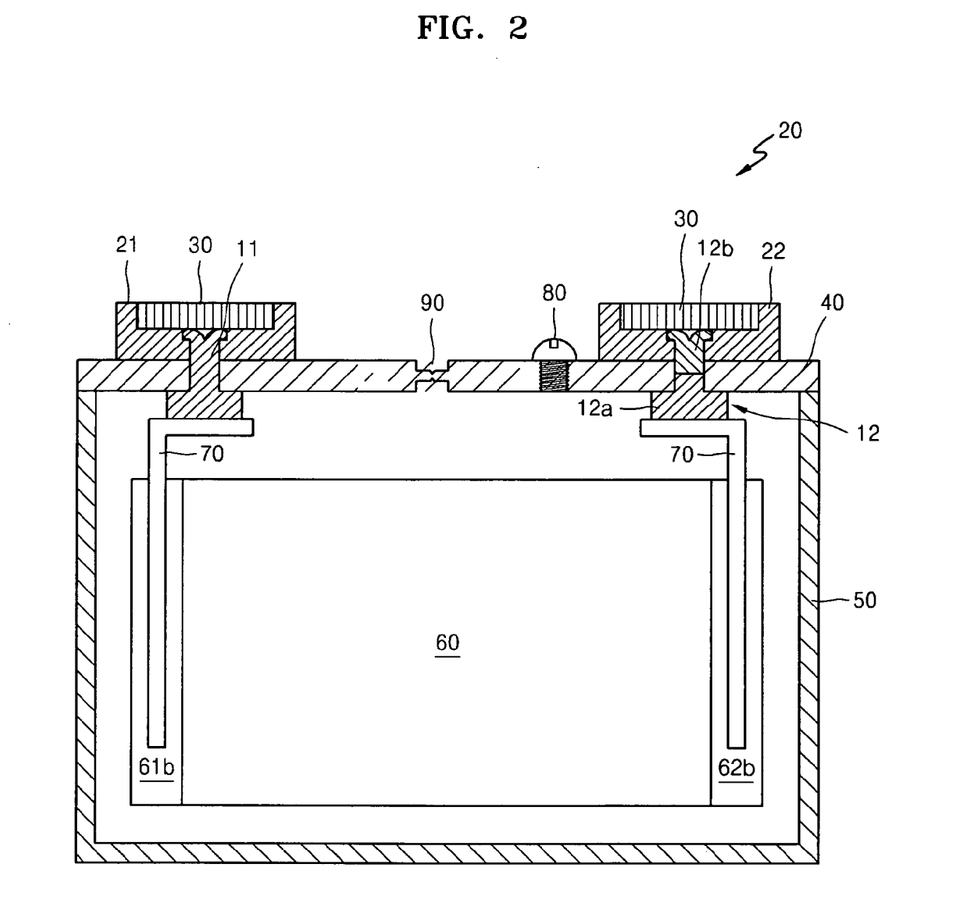
FIG. 2 illustrates a cross sectional view of a secondary battery of FIG. 1.

FIG. 1 illustrates a cross-sectional view of a secondary battery module according to an embodiment. FIG. 2 illustrates a cross sectional view of a secondary battery of FIG. 1 As illustrated in FIGS. 1 and 2, the secondary battery module according to the present embodiment may include a secondary battery 20 including an electrode assembly 60 in which a positive electrode, a negative electrode and a separator are wound in the form of a jelly roll, current collecting plates 70 bonded to two ends of the electrode assembly 60, a case 50 for accommodating the electrode assembly 60 and the current collecting plates 70, a cap assembly 40 bonded to an opening of the case 50, and the like. Accordingly, the electrode assembly 60 on which the current collecting plates 70 are attached may be inserted into the case 50 through the opening and then the cap assembly 40 may be covered, thereby preparing the secondary battery 20 in which the electrode assembly 60 is safely accommodated.

The cap assembly 40 may include a sealing member 80 for sealing an inlet after an electrolyte is injected into the case 50 through the inlet. The cap assembly 40 may also include a safety vent 90 to be broken so as to discharge a gas when internal pressure of the case 50 is excessively increased.

Figure 3:
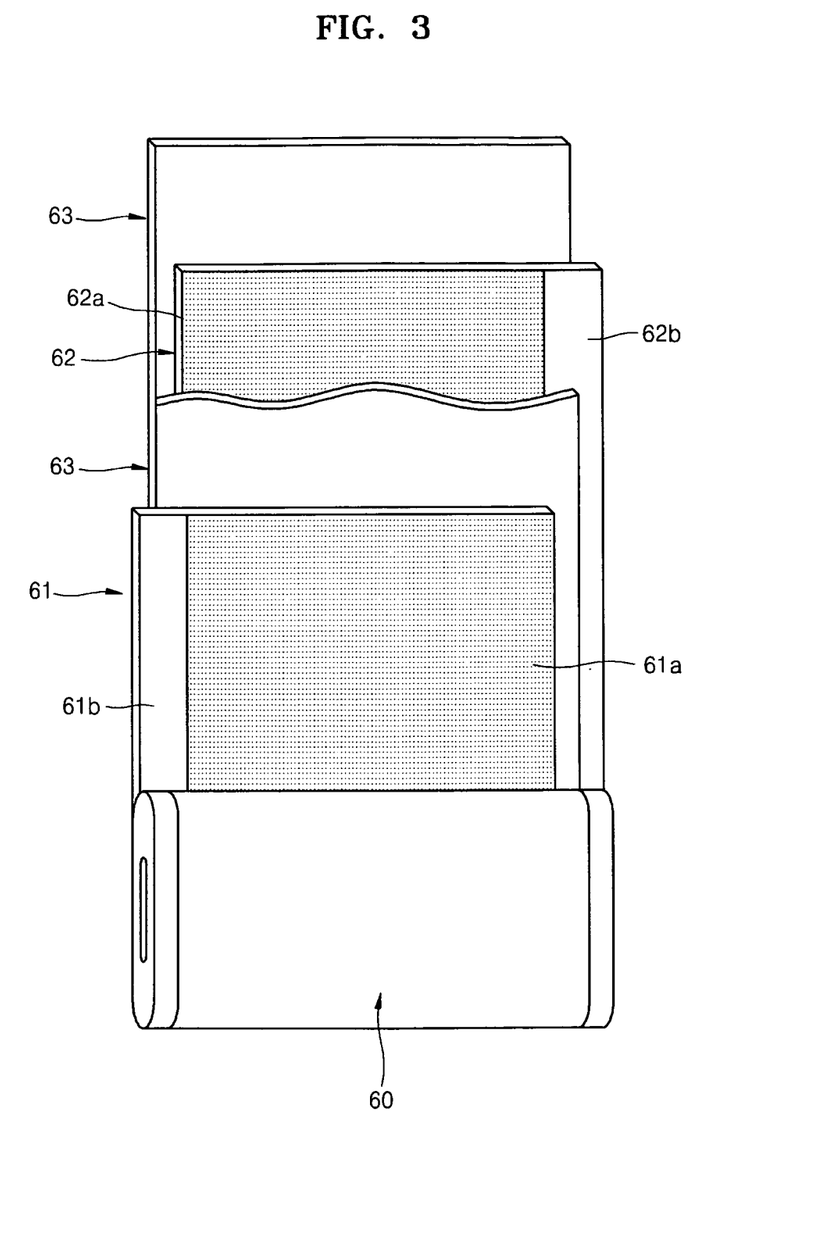
FIG. 3 illustrates a structural view of an electrode assembly illustrated in FIG. 2.

FIG. 3 illustrates a structural view of an electrode assembly illustrated in FIG. 2. As illustrated in FIG. 3, the electrode assembly 60 may be formed by alternately stacked a positive electrode 61, a separator 63, and a negative electrode 62 and then winding them in the form of a jelly roll. A positive electrode active material 61a may be coated on the positive electrode 61 and a negative electrode active material 62a may be coated on the negative electrode 62. Positive and negative electrode uncoated parts 61b and 62b on which an active material is not coated may be respectively formed on ends of the positive and negative electrodes 61 and 62. The positive electrode uncoated part 61b may be disposed at one end of the electrode assembly 60 and the negative electrode uncoated part 62b may be disposed at the other end of the electrode assembly 60, so as to be wound. For example, in FIG. 3, the positive electrode uncoated part 61b is disposed at a left end of the electrode assembly 60 and the negative electrode uncoated part 62b is disposed at a right end of the electrode assembly 60. Accordingly, a left current collecting plate 70 illustrated in FIG. 2 may be electrically connected to the positive electrode 61 of the electrode assembly 60 and a right current collecting plate 70 may be electrically connected to the negative electrode 62 of the electrode assembly 60. Then, the left and right current collecting plates 70 may be respectively connected to a positive electrode rivet 11 and a negative electrode rivet 12 of a terminal unit.

The terminal unit may include the positive and negative electrode rivets 11 and 12, rivet terminals 21 and 22 respectively welded to the positive and negative electrode rivets 11 and 12, and respective bus bars 30 respectively welded to the rivet terminals 21 and 22 so as to form a serial or parallel connection structure with neighboring, i.e., adjacent, secondary batteries. The terminal unit may include a multi-metal electrode rivet 12. The secondary battery 20 may include another terminal unit, the other terminal unit including another rivet terminal and another electrode rivet. In addition, the other rivet terminal and the other electrode rivet may be formed of a same metallic material. Furthermore, the terminal unit including the multi-metal electrode rivet 12 may have a polarity opposite to a polarity of the other terminal unit including the other electrode rivet. In an implementation, another electrode of the electrode assembly 60 may be electrically connected to at least one of a cap plate of the cap assembly and the case 50. In the secondary battery module of an embodiment, the bus bars 30 may include a bus bar 30 coupled to the terminal unit of one of the secondary batteries and to an adjacent secondary battery. The bus bar 30 may be formed of the second metallic material. In an implementation, the bus bar 30 may be coupled to a terminal of the adjacent secondary battery.

In the present embodiment, the positive electrode rivet 11 and the rivet terminals 21 and 22 and the bus bars 30 may be formed of similar metals, e.g., aluminum materials, and the negative electrode rivet 12 may be formed of a dissimilar metal, e.g., a copper material. In this case, welding between the positive electrode rivet 11 and the rivet terminal 21 or between the rivet terminals 21 and 22 and the bus bars 30 is similar metal welding. Accordingly, the similar metal welding may obtain a sufficient welding strength by using a general welding method and thus may be preformed by using a well-known method. However, since a bonding strength may be reduced if dissimilar metal welding is performed to bond the negative electrode rivet 12 and the rivet terminal 22 to each other, the negative electrode rivet 12 may be a multi-metal electrode rivet 12 formed from a dissimilar metal joint material such that similar metal welding may be performed between the negative electrode rivet 12 and the rivet terminal 22.

Figure 4:
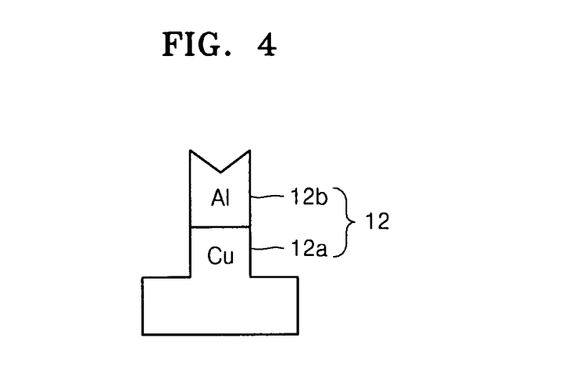
FIG. 4 illustrates a cross-sectional view of a negative electrode rivet of the secondary battery illustrated in FIG. 2.

FIG. 4 illustrates a cross-sectional view of a multi-metal negative electrode rivet 12 of the secondary battery illustrated in FIG. 2. As illustrated in FIG. 4, the multi-metal negative electrode rivet 12 includes a monolithic body that includes a head part 12a and a tail part 12b. As shown in FIG. 4, the head part 12a and the tail part 12b contact one another. The head part 12a of the negative electrode rivet 12, which is connected to the current collecting plate 70, may be formed of a copper material, and the tail part 12b of the negative electrode rivet 12, which is connected to the rivet terminal 22, may be formed of an aluminum material as in the rivet terminal 22. As such, bonding between the rivet terminal 22 and the negative electrode rivet 12 may also proceed via similar metal welding; and thus a sufficient bonding strength may be obtained by using a laser welding method.

However, when the negative electrode rivet 12 is formed as described above, dissimilar metal welding may be required between the head and tail parts 12a and 12b, and thus a general laser welding method may not provide a sufficient bonding force. Accordingly, in this case, if the head and tail parts 12a and 12b are bonded to each other by using a friction stir welding method, a sufficient bonding strength may be obtained.

Figure 5A:
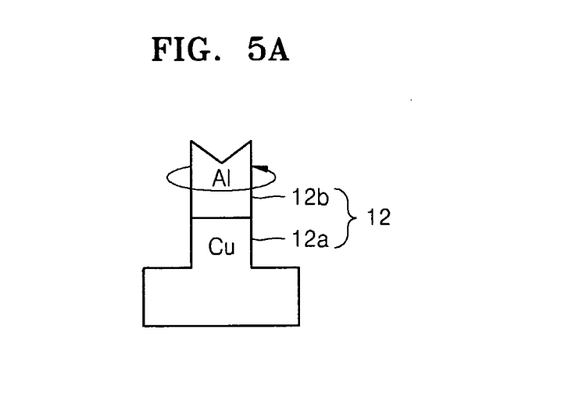
FIG. 5A schematically illustrates an operation of welding a negative electrode rivet by using a friction stir welding method according to an embodiment.

The friction stir welding method may be performed by rotating the head and tail parts 12a and 12b relative to one another as shown in FIG. 5A, thereby providing frictional heat to respective welding portions of the head and tail parts 12a and 12b. Since the friction stir welding method may be performed at a relatively low temperature in comparison to a laser welding method, a heat affected zone may be small, the respective welding portions may be uniformly mixed due to friction stirring, and a weld having a solid welding strength may be obtained, forming the monolithic body that includes the head and tail parts 12a and 12b.

FIG. 5A schematically illustrates an operation of welding the negative electrode rivet 12 by using a friction stir welding method. As illustrated in FIG. 5A, frictional heat may be generated by relatively rotating the head part 12a formed of a copper material and the tail part 12b formed of an aluminum material. Thus, contact portions of the head and tail parts 12a and 12b may be locally melted and mixed, thereby obtaining a solid welding strength.

The negative electrode rivet 12 formed as described above may be welded to the rivet terminal 22 as described below.

Figure 5B:
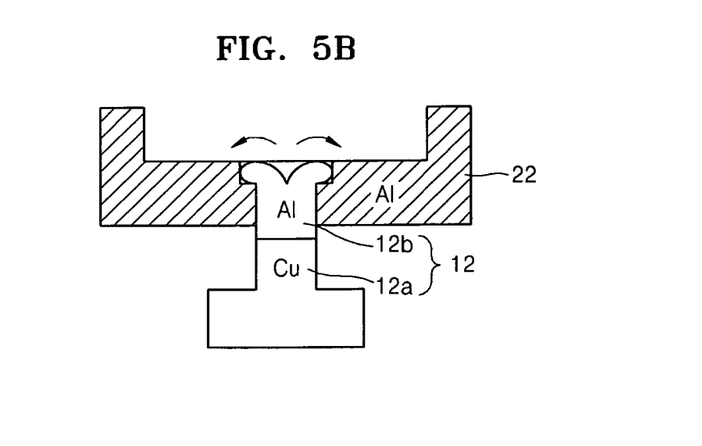
FIGS. 5B through 5C illustrate cross-sectional views of stages in a method of bonding a negative electrode rivet and a rivet terminal in the secondary battery module illustrated in FIG. 1.
Figure 5C:
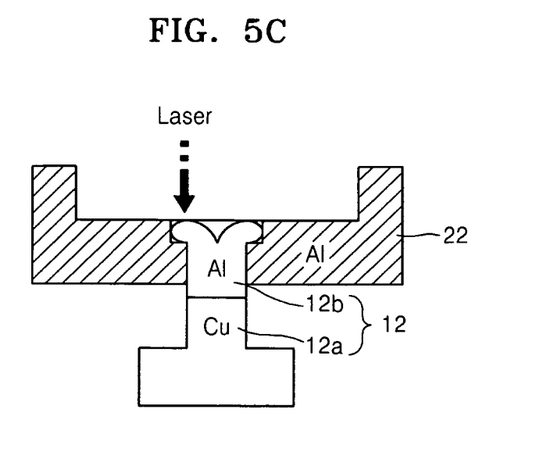

FIGS. 5B through 5C illustrate cross-sectional views of stages in a method of bonding a negative electrode rivet and a rivet terminal in the secondary battery module illustrated in FIG. 1. Initially, as illustrated in FIG. 5B, a front end of the tail part 12b of the negative electrode rivet 12 may be installed in an opening in the rivet terminal 22. Before installation, the front end of the tail part 12b may have a size sufficiently small to pass through the opening. As shown in FIG. 5B, the front end of the tail part 12b may be rivet-processed so as to closely contact upper portions of the rivet terminal 22. As indicated by curved arrows in FIG. 5B, the front end of the tail part 12b may thus be deformed such that a deformed portion overlaps a periphery of the opening in the rivet terminal 22. As such, the rivet terminal 22 may be locked by the rivet-processed front end of the negative electrode rivet 12 and thus may not be separated away.

After that, as illustrated in FIG. 5C, boundaries between the negative electrode rivet 12 and the rivet terminal 22 may be bonded by using, e.g., a laser welding method. In this case, the welded portions of the negative electrode rivet 12 and the rivet terminal 22 are similar metals, i.e., aluminum materials, and thus a sufficient bonding strength may be obtained by using a laser welding method.

Also, bonding between the rivet terminals 21 and 22 and the bus bars 30 may proceed via a similar metal welding method between aluminum materials, and thus may be performed by using a general laser welding method.

Accordingly, as described above, since similar metal welding may be performed when a terminal unit for a secondary battery is assembled, a very stable and solid bonding structure may be formed.

Figure 6:
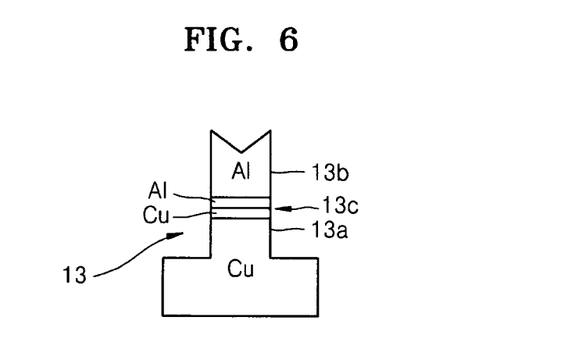
FIG. 6 illustrates a cross-sectional view of a negative electrode rivet according to another embodiment.

FIG. 6 illustrates a cross-sectional view of a negative electrode rivet 13 according to another embodiment. Like the negative electrode rivet 12 illustrated in FIG. 4, the negative electrode rivet 13 may include a head part 13a formed of, e.g., a copper material, and a tail part 13b formed of, e.g., an aluminum material. However, in the present embodiment, the head and tail parts 13a and 13b of the negative electrode rivet 13 may be bonded to each other by using a clad metal 13c instead of a friction stir welding method, forming a monolithic body that includes the head and tail parts 13a and 13b, and a part formed by the clad metal 13c between the head and tail parts 13a and 13b, as shown in FIG. 6. The clad metal 13c may be formed by pressure welding a copper plate formed of a copper material as in the head part 13a and an aluminum plate formed of an aluminum material as in the tail part 13b. If the head and tail parts 13a and 13b are welded to each other by interposing the clad metal 13c therebetween, similar metal welding may be performed and thus a sufficient bonding strength may be obtained by using a general laser welding method. After that, bonding between the negative electrode rivet 13 and the rivet terminal 22 may be performed as described above in relation to FIGS. 5B and 5C. Accordingly, similar metal welding may be performed between the negative electrode rivet 13 and the rivet terminal 22 and thus a stable bonding strength may be obtained.

Figure 7:
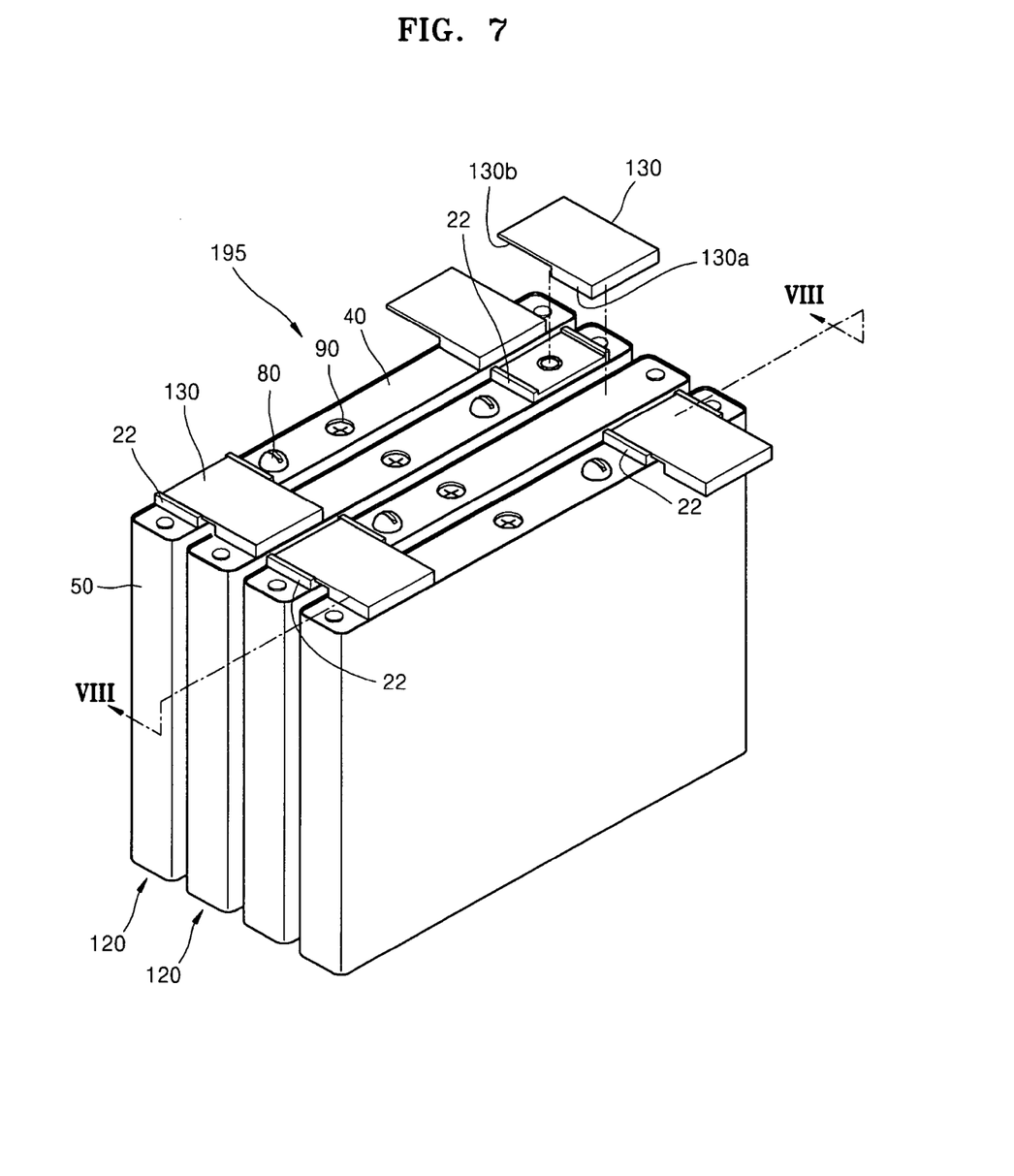
FIG. 7 illustrates a perspective view of a secondary battery module according to another embodiment.
Figure 8:
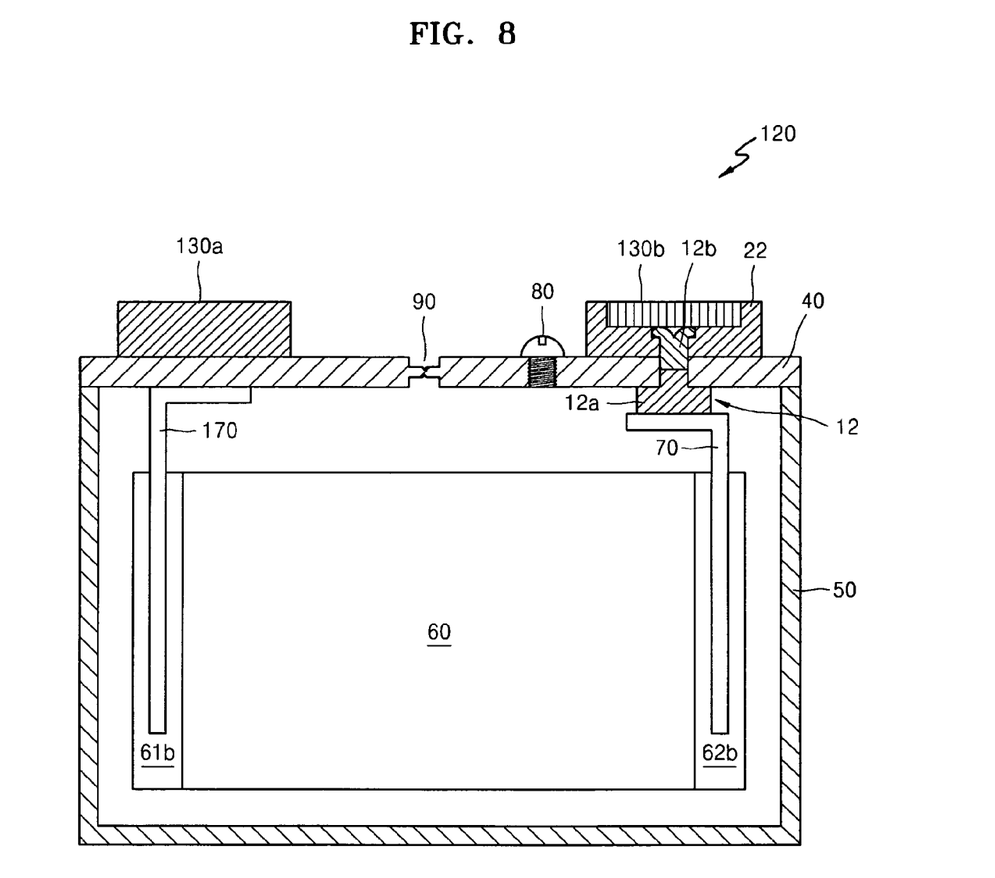
FIG. 8 illustrates a cross sectional view of a secondary battery of FIG. 7.

FIG. 7 illustrates a perspective view of a secondary battery module according to another embodiment. FIG. 8 illustrates a cross sectional view of a secondary battery of FIG. 7. In the embodiment illustrated in FIGS. 7 and 8, similar elements are designated with similar reference numerals and repeated description thereof are omitted. In the present embodiment, the terminal unit 22 of one of the secondary batteries 120 may be electrically connected in series or in parallel to the cap assembly 40 of an adjacent secondary battery 120 by using a bus bar 130. In this case, the cap assembly 40 of the adjacent secondary battery may be electrically connected to one of the electrode plates of the electrode assembly 60 and may serve as a terminal. In particular, the bus bar 130 may include a thick region 130a and a thin region 130b. The thin region 130b may be coupled to the terminal unit 22 of one of the secondary batteries 120 and the thick region 130a may be coupled to the cap assembly 40 of an adjacent secondary battery 120. Such a configuration of the bus bar 130 may facilitate accommodation of differences in height between the terminal unit 22 of the one secondary battery 120 and the cap assembly 40 of the adjacent secondary battery 120.

Meanwhile, although the above descriptions are provided with respect to difficulties associated with dissimilar metal welding between a rivet terminal and a negative electrode rivet from among electrode rivets, in some cases, dissimilar metal welding may occur between a rivet terminal and a positive electrode rivet. Accordingly, regardless of the type of electrode rivet, when dissimilar metal welding is performed between an electrode rivet and a rivet terminal, if the electrode rivet is formed and used as a dissimilar metal joint material, a stable and solid bonding structure may be obtained.

As a result, according to one or more of the above embodiments, bonding may be performed between an electrode rivet and a rivet terminal by performing similar metal welding, and thus a solid bonding strength may be ensured.

According to the embodiments, good weldability may be achieved and a high bonding strength may be obtained. In particular, even if the rivet terminals are formed of dissimilar metals corresponding to the metals for forming the positive and negative electrode rivets, weldability between the positive and negative electrode rivets and the rivet terminals may be improved, while still avoiding problems associated with dissimilar metal welding between at least one of the rivet terminals and a corresponding bus bar. Thus, a reduction in weldability may be avoided. Accordingly, the embodiment may represent a solution for preventing a reduction in weldability, which may be caused when dissimilar metal welding is performed in a terminal unit.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
   an electrode assembly, the electrode assembly including a positive electrode, a negative electrode, and a separator therebetween;
   a case for accommodating the electrode assembly;
   a cap plate for sealing the case; and
   at least one terminal unit, the at least one terminal unit including a rivet terminal and a multi-metal electrode rivet, wherein:
      the multi-metal electrode rivet is electrically connected to the rivet terminal and one of the electrodes of the electrode assembly,
      the rivet terminal includes an opening through which the multi-metal electrode rivet passes,
      the multi-metal electrode rivet includes a monolithic body having a first part and a second part, the second part having a size sufficiently small to pass through the opening before installation of the multi-metal electrode rivet, the second part being deformed after installation of the multi-metal electrode rivet in the opening such that a deformed portion of the second part overlaps a periphery of the opening,
      the rivet terminal and the second part are each formed of a same second metallic material,
      the first part is formed of a first metallic material, and
      the first metallic material is different from the second metallic material.

2. The secondary battery as clamed in claim 1, wherein the first metallic material is copper and the second metallic material is aluminum.

3. The secondary battery as claimed in claim 1, wherein the first part and the second part have a first interface where the first and second parts contact one another, the first interface including a first weld where the first part and the second part are friction stir welded to each other.

4. The secondary battery as claimed in claim 1, wherein the second part and the rivet terminal have a second interface where the second part and the rivet terminal contact one another, the second interface including a second weld where the second part of the multi-metal electrode rivet is laser welded to the rivet terminal.

5. The secondary battery as claimed in claim 1, wherein the monolithic body includes a clad unit between the first part and the second part.

6. The secondary battery as claimed in claim 5, wherein the clad unit includes a first metal layer and a second metal layer between the first part and the second part, the first metal layer being coupled to the first part and the second metal layer being coupled to the second part, the first metal layer being formed of the first metallic material, and the second metal layer being formed of the second metallic material.

7. The secondary battery as claimed in claim 1, wherein the first part is a head part and the second part is a tail part, the tail part being deformed after installation of the multi-metal electrode rivet.

8. The secondary battery as claimed in claim 1, further comprising another terminal unit, the other terminal unit including another rivet terminal and another electrode rivet, wherein the other rivet terminal and the other electrode rivet are formed of a same metallic material.

9. The secondary battery as claimed in claim 8, wherein the terminal unit including the multi-metal electrode rivet has a polarity opposite to a polarity of the other terminal unit including the other electrode rivet.

10. The secondary battery as claimed in claim 1, wherein another electrode of the electrode assembly is electrically connected to at least one of the cap plate and the case.

11. A secondary battery module, comprising a plurality of secondary batteries, at least one of the secondary batteries including:
   an electrode assembly, the electrode assembly including a positive electrode, a negative electrode, and a separator therebetween;
   a case for accommodating the electrode assembly;
   a cap plate for sealing the case; and
   at least one terminal unit, the at least one terminal unit including a rivet terminal and a multi-metal electrode rivet, wherein:
      the multi-metal electrode rivet is electrically connected to the rivet terminal and one of the electrodes of the electrode assembly,
      the rivet terminal includes an opening through which the multi-metal electrode rivet passes,
      the multi-metal electrode rivet includes a monolithic body having a first part and a second part, the second part having a size sufficiently small to pass through the opening before installation of the multi-metal electrode rivet, the second part being deformed after installation of the multi-metal electrode rivet in the opening such that a deformed portion of the second part overlaps a periphery of the opening,
      the rivet terminal and the second part are each formed of a same second metallic material,
      the first part is formed of a first metallic material, and
      the first metallic material is different from the second metallic material.

12. The secondary battery module as claimed in claim 11, further comprising a bus bar coupled to the terminal unit of at least one of the secondary batteries and to an adjacent secondary battery.

13. The secondary battery module as claimed in claim 12, wherein the bus bar is formed of the second metallic material.

14. The secondary battery as claimed in claim 12, wherein the bus bar is coupled to a terminal of the adjacent secondary battery.

* * * * *